United States Patent
Zheng et al.

(10) Patent No.: US 11,382,099 B2
(45) Date of Patent: Jul. 5, 2022

(54) METHOD OF ALLOCATING TIME SLOTS FOR WIRELESS HEADSET, AND WIRELESS HEADSET USING THE SAME

(71) Applicant: Telink Semiconductor (Shanghai) Co., Ltd., Shanghai (CN)

(72) Inventors: Mingjian Zheng, Shanghai (CN); Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 173 days.

(21) Appl. No.: 16/926,225

(22) Filed: Jul. 10, 2020

(65) Prior Publication Data

US 2021/0136756 A1    May 6, 2021

(30) Foreign Application Priority Data

Nov. 6, 2019   (CN) .......................... 201911076800.0

(51) Int. Cl.
| | |
|---|---|
| *H04W 72/04* | (2009.01) |
| *H04W 4/80* | (2018.01) |
| *H04M 1/72412* | (2021.01) |
| *H04L 1/16* | (2006.01) |
| *H04R 1/10* | (2006.01) |
| *H04L 1/18* | (2006.01) |
| *H04W 28/04* | (2009.01) |

(52) U.S. Cl.
CPC ....... *H04W 72/0446* (2013.01); *H04L 1/1642* (2013.01); *H04L 1/1864* (2013.01); *H04M 1/72412* (2021.01); *H04R 1/1041* (2013.01); *H04W 4/80* (2018.02); *H04W 28/04* (2013.01); *H04W 72/0406* (2013.01); *H04R 2420/07* (2013.01)

(58) Field of Classification Search
CPC ......... H04W 72/0046; H04W 72/0406; H04M 1/72412
See application file for complete search history.

(56) References Cited

U.S. PATENT DOCUMENTS

| | | | |
|---|---|---|---|
| 7,877,121 B2 * | 1/2011 | Seshadri | H04M 1/6066 381/74 |
| 10,200,791 B1 * | 2/2019 | Liu | H04W 4/80 |
| 10,200,803 B1 * | 2/2019 | Tong | H04S 1/005 |
| 10,244,307 B1 * | 3/2019 | Tong | H04R 1/1091 |
| 10,412,567 B1 * | 9/2019 | Tong | H04W 76/10 |

(Continued)

*Primary Examiner* — David Bilodeau
(74) *Attorney, Agent, or Firm* — Panitch Schwarze Belisario & Nadel LLP

(57) ABSTRACT

Disclosed is a method of allocating time slots for a wireless headset in a communication period, the wireless headset comprising a first earpiece and a second earpiece that are independent from each other, wherein the method comprises: sending, by the first earpiece, a request message to a mobile device in a first time slot of the communication period; sending, by the mobile device, audio data to the first earpiece and the second earpiece in a plurality of time slots subsequent to the first time slot based on the request message; sending, by the first earpiece, a first control message to the second earpiece in a second time slot after the plurality of time slots; and sending, by the second earpiece, a second control message to the first earpiece in a third time slot subsequent to the second time slot based on the first control message.

20 Claims, 4 Drawing Sheets

(56) References Cited

U.S. PATENT DOCUMENTS

| | | | | |
|---|---|---|---|---|
| 10,432,773 | B1* | 10/2019 | Tong | H04M 1/6066 |
| 2017/0366924 | A1* | 12/2017 | Thoen | H04W 84/20 |
| 2019/0174557 | A1* | 6/2019 | Ueda | H04R 3/12 |
| 2021/0160697 | A1* | 5/2021 | Zheng | H04W 4/80 |
| 2021/0211853 | A1* | 7/2021 | Zheng | G08C 17/02 |

* cited by examiner

METHOD OF ALLOCATING TIME SLOTS FOR WIRELESS HEADSET, AND WIRELESS HEADSET USING THE SAME

CROSS-REFERENCE TO RELATED PATENT APPLICATION

This application claims the benefit of and priority to Chinese Patent Application No. 201911076800.0 filed on Nov. 6, 2019, the entire disclosure of which is incorporated by reference herein.

FIELD OF THE INVENTION

The present invention relates to the field of data processing, and in particular, to a method of allocating time slots for a wireless headset and a wireless headset using the same.

BACKGROUND OF THE INVENTION

Bluetooth communication technology is a wireless communication technology generally applied between two devices. However, in the application scenario of a wireless headset, since a plurality of wirelessly connected devices (for example, two earpieces and one mobile device) need to communicate with each other, it is necessary to improve the Bluetooth communication technology according to the application scenario in order to apply Bluetooth communication technology.

SUMMARY OF THE INVENTION

In order to effectively solve the related technical problem, the present invention puts forward a method for realizing periodic communication between a mobile phone and a plurality of earpieces including a primary earpiece and a secondary earpiece based on time slots and the master-slave connection relationship in the Bluetooth communication technology.

In one aspect of the invention, there provides a method of allocating time slots for a wireless headset in a communication period, the wireless headset including a first earpiece and a second earpiece that are configured to receive audio data from a mobile device and are independent from each other, wherein the method includes: 1) sending, by the first earpiece, a request message to the mobile device in a first time slot of the communication period; 2) sending, by the mobile device, the audio data with a preset time slot-based length to the first earpiece and the second earpiece in a plurality of time slots subsequent to the first time slot based on the request message; 3) sending, by the first earpiece, a first control message to the second earpiece in a second time slot after the plurality of time slots; and 4) sending, by the second earpiece, a second control message to the first earpiece in a third time slot subsequent to the second time slot based on the first control message.

In another aspect of the invention, there provides a wireless headset, for which time slots are allocated in a communication period, including a first earpiece and a second earpiece, wherein the first earpiece is configured to send a request message to a mobile device in a first time slot of the communication period, receive audio data with a preset time slot-based length sent by the mobile device in a plurality of time slots subsequent to the first time slot, and send a first control message to the second earpiece in a second time slot after the plurality of time slots; and the second earpiece is configured to receive the audio data with the preset time slot-based length sent by the mobile device in the plurality of time slots subsequent to the first time slot and send a second control message to the first earpiece in a third time slot subsequent to the second time slot based on the first control message; and wherein the first earpiece and the second earpiece are wirelessly connected with the mobile device and are independent from each other.

In yet another aspect of the invention, there provides a method of allocating time slots for a wireless headset in a communication period, the wireless headset including a first earpiece, a second earpiece and at least one other earpiece that are configured to receive audio data from a mobile device and are independent from each other, wherein the method includes: 1) sending, by the first earpiece, a request message to the mobile device in a first time slot of the communication period; 2) sending, by the mobile device, the audio data with a preset time slot-based length to the first earpiece, the second earpiece and the at least one other earpiece in a plurality of time slots subsequent to the first time slot based on the request message; 3) sending, by the first earpiece, a first control message to the second earpiece and the at least one other earpiece in a second time slot after the plurality of time slots; and 4) sending, by the second earpiece, a second control message to the first earpiece and the at least one other earpiece in a third time slot subsequent to the second time slot based on the first control message.

In still another aspect of the invention, there provides a wireless headset, for which time slots are allocated in a communication period, including a first earpiece, a second earpiece and at least one other earpiece, wherein the first earpiece is configured to send a request message to a mobile device in a first time slot of the communication period, receive audio data with a preset time slot-based length sent by the mobile device in a plurality of time slots subsequent to the first time slot, and send a first control message to the second earpiece and the at least one other earpiece in a second time slot after the plurality of time slots; a second earpiece is configured to receive the audio data with the preset time slot-based length sent by the mobile device in the plurality of time slots subsequent to the first time slot, and send a second control message to the first earpiece in a third time slot subsequent to the second time slot based on the first control message; and the at least one other earpiece is configured to receive the audio data with the preset time slot-based length sent by the mobile device in the plurality of time slots subsequent to the first time slot, receive the first control message in the second time slot, and receive the second control message in the third time slot; and wherein the first earpiece, the second earpiece and the at least one other earpiece are wirelessly connected with the mobile device and are independent from each other.

In the embodiments of the invention, a mobile phone can effectively send audio data to a plurality of earpieces, while realizing information interaction between the primary earpiece and the secondary earpiece.

It should be noted that, the above illustration only shows a summary of the technical solutions of the invention for more clearly understanding the technical means of the invention and hence implementing the invention in accordance with the contents of the disclosure. In order to make the above and other objects, features and advantages more apparent, specific implementation of the invention will be illustrated below by examples.

BRIEF DESCRIPTION OF THE DRAWINGS

One of ordinary skills in the art may understand the advantages and benefits described herein and other advantages and benefits by reading the detailed description of the exemplary embodiments below. The drawings are merely provided for illustrating some exemplary embodiments, rather than being regarded as limiting the invention. Moreover, throughout the drawings, the same reference signs are used to represent the same elements. In the drawings.

DETAILED DESCRIPTION OF THE EMBODIMENTS

Figure 1:
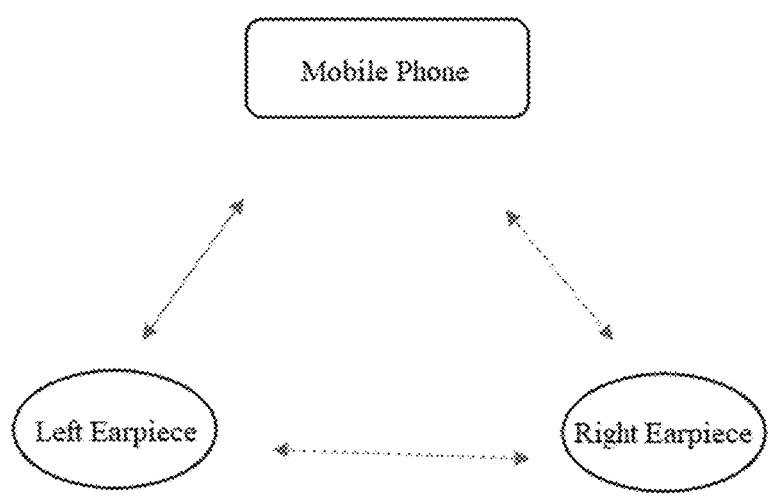
FIG. 1 shows a schematic diagram of the signal transmission for a wireless headset according to an embodiment of the invention.

Exemplary embodiments of the present disclosure will be described in more detail below with reference to the drawings. Although exemplary embodiments of this disclosure are shown in the drawings, it should be understood that this disclosure may be implemented in various forms, rather than being limited to the embodiments illustrated herein. On the contrary, these embodiments are provided for more thoroughly understanding this disclosure and fully conveying the scope of this disclosure to one skilled in the art.

It should be understood that, in the present disclosure, terms such as "include" or "have", etc., intend to indicate the existence of a feature, a digit, a step, a behavior, a component, a part disclosed in the present disclosure or a combination thereof, without excluding the possibility of the existence of one or more other features, digits, steps, behaviors, components, parts or combinations thereof.

Additionally, it further needs to be noted that, in the case of no conflicts, the embodiments of the invention and the features illustrated in the embodiments may be combined with each other. The invention will be illustrated in detail below referring to the drawings and in conjunction with the embodiments.

FIG. 1 shows a schematic diagram of the signal transmission for a wireless headset according to an embodiment of the invention.

In an application scenario of a wireless headset, a mobile phone needs to send data to a left earpiece and a right earpiece, and the left earpiece and the right earpiece are wirelessly connected. In the solution of the invention, one earpiece of a Bluetooth wireless headset may be taken as the primary earpiece, and the other earpiece is taken as the secondary earpiece. For example, as shown in FIG. 1, the left earpiece is taken as the primary earpiece. The connection between the mobile phone and the left earpiece is the primary connection. The right earpiece locally forms a state totally consistent with the left earpiece via interaction with the left earpiece, thus the right earpiece may replace the left earpiece as required at any moment to carry out Bluetooth communication with the mobile phone, without reestablishing a Bluetooth connection with the mobile phone. The right earpiece and the left earpiece may be connected via a synchronous channel, and the right earpiece may become a device connected via actual Bluetooth connection by switching the primary-secondary relationship at any moment. Correspondingly, the left earpiece keeps in a state consistent with that of the right earpiece and may replace the right earpiece to carry out Bluetooth communication with the mobile phone at any moment.

Figure 2:
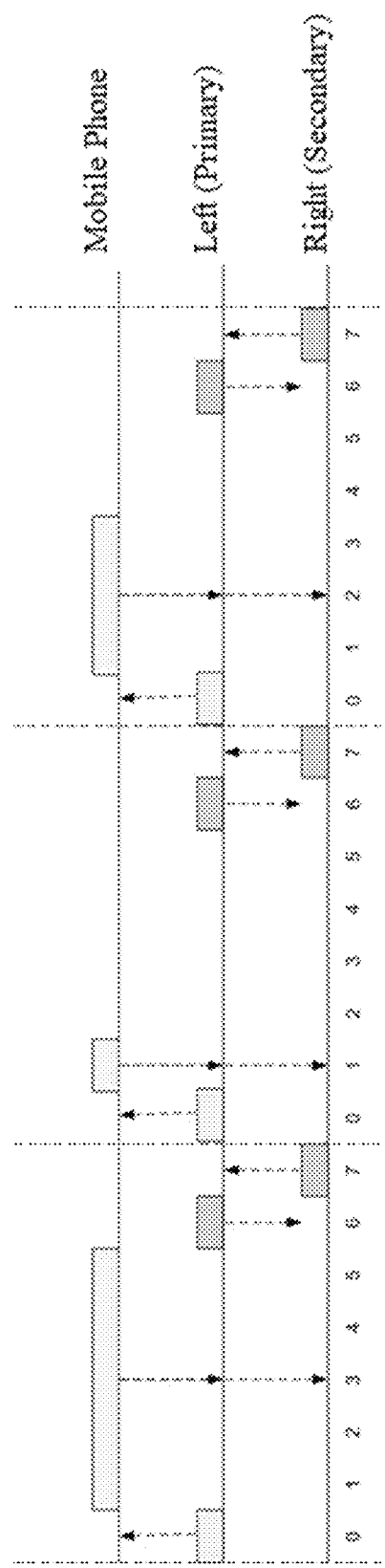
FIG. 2 shows a schematic timing diagram of the signal transmission during the communication between a mobile phone and a wireless headset with two earpieces according to an embodiment of the invention.

FIG. 2 shows a schematic timing diagram of the signal transmission during the communication between a mobile phone and a wireless headset with two earpieces according to an embodiment of the invention.

According to the standard of Bluetooth communication, one channel may be divided into a plurality of time slots. When a mobile phone communicates with the left earpiece and the right earpiece of a Bluetooth wireless headset, a preset number of time slots may be taken as a communication period (period, for short). FIG. 2 shows a schematic diagram in which eight time slots are taken as a period. In some embodiments, a period with more or less than eight time slots may also be employed.

In FIG. 2, since the left earpiece is the primary earpiece, the left earpiece sends a request message to the mobile phone in time slot #0 so as to make the mobile phone send audio data to the two earpieces in time slot #1. In the embodiment of FIG. 2, 5 time slots may be provided for the mobile phone to send the audio data, and the mobile phone may practically occupy 1, 3 or 5 time slots to send the audio data (for example, as shown by the middle part, the right part and the left part of FIG. 2). In other embodiments, more time slots may be provided for the mobile phone to send the audio data, and the mobile phone may also practically occupy different number of time slots to send the audio data. In the present disclosure, the time slot-based length of the audio data is represented by the number of time slots practically occupied by the audio data in one period. The audio data may be in the form of a data packet, for example, the mobile phone may send one data packet in each period.

In time slot #6 after five time slots, the left earpiece may send a first control message to the right earpiece. In time slot #7 subsequent to time slot #6, the right earpiece may send a second control message to the left earpiece.

In some embodiments of the invention, the first control message may include local earpiece address information (for example, BD_ADDR of the local earpiece) and local clock information (for example, CLKN in the Bluetooth standard) (the local earpiece address information and the local clock information are used for keeping the consistency of the right earpiece and the left earpiece in time), audio data packet sequence number (for indicating the serial number of a received data packet that represents the audio data, for example, Sequence Number in the AVDTP protocol) and control command, etc. In some embodiments, the control command may include a plurality of subcommands, which are configured for executing different functions respectively. In some embodiments of the invention, the second control message may include an audio data packet sequence number and response information to a control command, etc.

In the present disclosure, since the first control message and the second control message may include an audio data packet sequence number, when the audio data packet sequence number in the second control message sent by the right earpiece is different from the audio data packet sequence number in the first control message sent by the left earpiece, the left earpiece may send a request message including a retransmission command to the mobile phone in the next period, wherein the retransmission command is configured for instructing the mobile phone to retransmit the audio data having transmitted in the previous period. Generally, the audio data retransmission operation is triggered in the case that the left earpiece or the right earpiece loses a data packet.

In the present disclosure, the control information in the first control message may further include a control information period update command and a control information period update set value, wherein the control information period update command is configured for indicating that the number of communication periods per which the left earpiece and the right earpiece exchange the first and the second control messages needs to be changed, and the control information period update set value is configured for indicating the number of communication periods per which the left earpiece and the right earpiece can exchange the first and the second control messages subsequent to a current period. The control information in the second control message may further include response information to the control information period update command. Therefore, the left earpiece and the right earpiece may determine according to the control information period update command that the number of communication periods per which the left earpiece and the right earpiece exchange the first and the second control messages needs to be changed, and the left earpiece and the right earpiece may further determine according to the control information period update set value the number of communication periods per which the left earpiece and the right earpiece can exchange the first and the second control messages subsequent to the current period. For example, when the control information period update set value is 2, the left earpiece sends a first control message to the right earpiece in time slot #6 of the second period subsequent to the current period, and the right earpiece sends a second control message to the left earpiece in time slot #7 of the second period subsequent to the current period.

Figure 3:
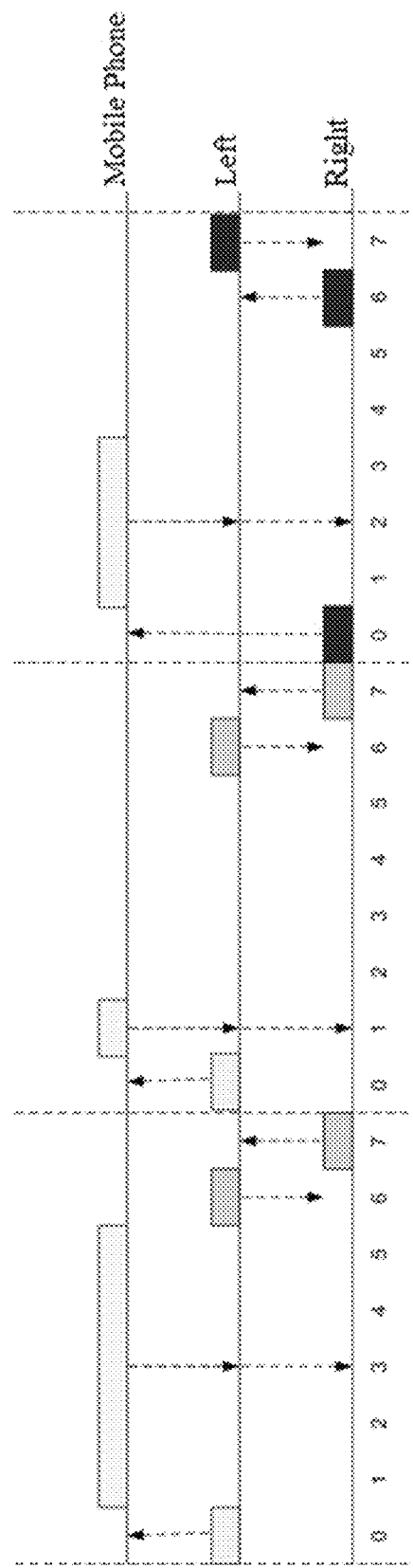
FIG. 3 shows a schematic timing diagram of the signal transmission when a mobile phone communicates with a wireless headset having two earpieces and the primary-secondary relationship of the two earpieces is switched according to an embodiment of the invention.

FIG. 3 shows a schematic timing diagram of the signal transmission when a mobile phone communicates with a wireless headset having two earpieces and the primary-secondary relationship of the two earpieces is switched according to an embodiment of the invention.

In some scenarios, the primary-secondary relationship of the two earpieces may be switched in the technical solution of the invention. For example, when the left earpiece has acted as the primary earpiece for a relatively long time and consumed relatively more electric power, the right earpiece may be switched as the primary earpiece in the technical solution of the invention.

In some embodiments of the invention, as shown by the middle part of FIG. 3, the left earpiece may send a first control message to the right earpiece in time slot #6. In this embodiment, the first control message may include local clock information, a sequence number and a control command, wherein the control command further includes a switching command for switching the primary-secondary relationship. In some embodiments, the first control message may further include a local state information signature, which indicates the state of a local device connected via Bluetooth. When the local state information signatures of the left earpiece and the right earpiece are consistent with each other, the primary-secondary relationship between the left earpiece and the right earpiece may be switched. The switching of the primary-secondary relationship between the left earpiece and the right earpiece refers to changing the operation currently executed by the left earpiece to be executed by the right earpiece, and changing the operation currently executed by the right earpiece to be executed by the left earpiece. In other words, the switching of the primary-secondary relationship between the left earpiece and the right earpiece is the switching of the operations of the left earpiece and the right earpiece. When the control command of the first control message includes a switching command for switching the primary-secondary relationship between the left earpiece and the right earpiece, the operation of switching the primary-secondary relationship will be executed in the next period of the current period.

In some embodiments, the first control message may further include a delayed-switching command for indicating the number of communication periods for which switching of the primary-secondary relationship between the left earpiece and the right earpiece is to be delayed subsequent to the current period. According to the delayed-switching command, the left earpiece and the right earpiece may determine the period in which the operation of switching the primary-secondary relationship thereof is to be practically executed, i.e., the number of periods for which switching of the primary-secondary relationship thereof is to be delayed. In some embodiments, the delayed-switching command enables the operation of switching the primary-secondary relationship between the left earpiece and the right earpiece to be delayed for a plurality of periods, wherein the number of said plurality of periods is larger than 1.

After receiving the first control message, the right earpiece sends a second control message to the left earpiece in time slot #7. The second control message may include a sequence number and response information to the switching command. In some embodiments, the second control message may further include a local state information signature. In some embodiments, the second control message may further include response information to the delayed-switching command.

After the left earpiece receives the second control message, the right earpiece becomes the primary earpiece in the next period and sends a request message to the mobile phone, as shown by the right part of FIG. 3. In this period, after the audio data is sent, the right earpiece sends the first control message to the left earpiece, and then the left earpiece sends the second control message to the right earpiece.

In some embodiments, when the left earpiece fails to receive the second control message (that is, in the case that the second control message is lost), the left earpiece may resend the switching command or the delayed-switching command in the next period of the current period. In some embodiments, in the case that the left earpiece has sent the delayed-switching command but fails to receive the second control message in the current period, the left earpiece may reduce the number of periods for delaying as indicated by the delayed-switching command in the next period of the current period. For example, in the case that the delayed-switching command sent in the current period indicates that the switching operation is to be delayed for five periods subsequent to the current period, when the left earpiece fails to receive the second control message containing response information to the delayed-switching command, the delayed-switching command sent by the left earpiece in the next period of the current period will indicate that the switching operation is to be delayed for four periods subsequent to the current period.

Figure 4:
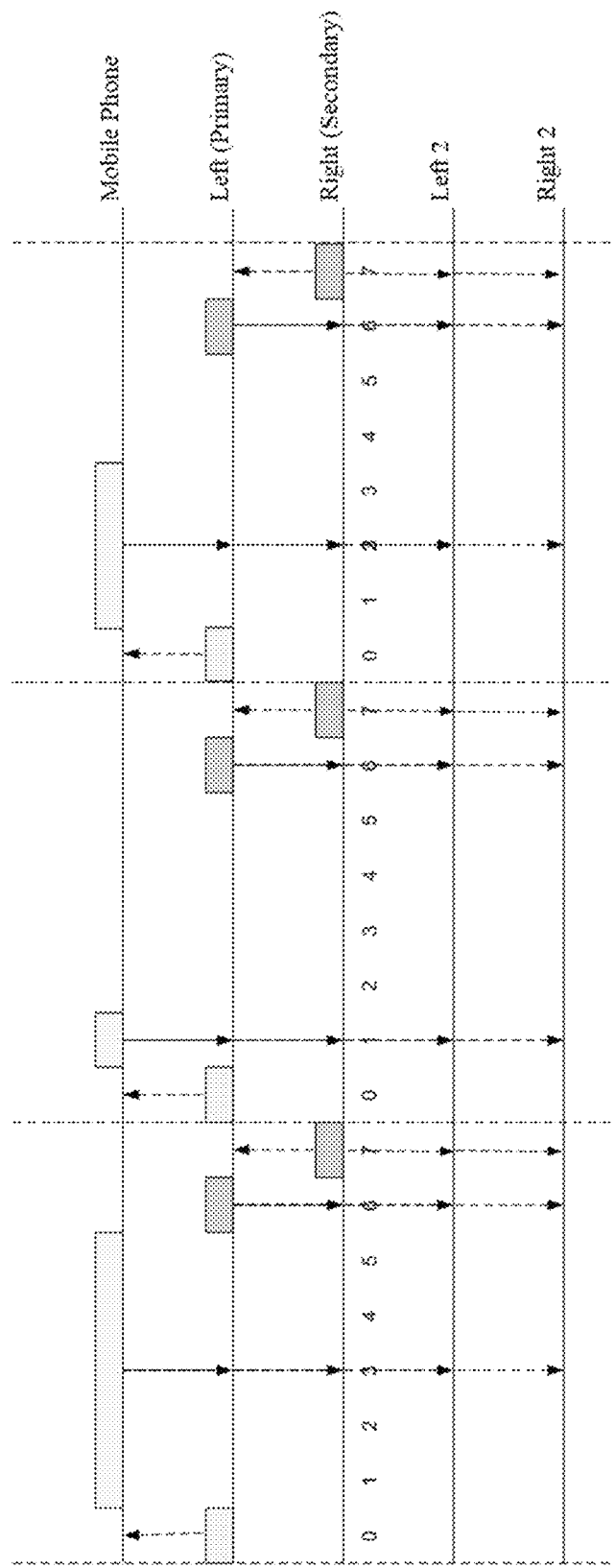
FIG. 4 shows a schematic timing diagram of the signal transmission during the communication between a mobile phone and a wireless headset with four earpieces according to an embodiment of the invention.

FIG. 4 shows a schematic timing diagram of the signal transmission during the communication between a mobile phone and a wireless headset with four earpieces according to an embodiment of the invention.

The solution of the invention may be further adapted to situation in which one mobile phone sends audio data to a plurality of headsets. As shown in FIG. 4, it shows a solution in which the mobile phone may further send audio data to a second left earpiece and a second right earpiece. In some embodiments, the second left earpiece and the second right earpiece are configured to receive audio data, the first control message from the left earpiece and the second control message from the right earpiece. In some embodiments, the second left earpiece and the second right earpiece do not send any information.

In comparison with the solution of FIG. 2, the solution shown in FIG. 4 additionally has a second left earpiece and a second right earpiece, and the rest configuration is totally the same as the solution shown in FIG. 2. Therefore, in some embodiments, based on the solution shown in FIG. 4, the solution of retransmitting audio data, the solution of changing the periods for exchanging the control information and/or the solution of switching the primary-secondary relationship between the left earpiece and the right earpiece may also be implemented.

The flow charts and block diagrams in the drawings show some realizable architectures, functions and operations of the method, device and computer-readable storage medium according to various embodiments of the invention. It should be noted that, the steps represented by each block in the flow chart are not necessarily carried out in the order shown by the reference signs, sometimes, the steps may be basically carried out in parallel, and sometimes, the steps may be carried out in a reversed order, which is determined by the functions concerned. It further needs to be noted that, each block in the block diagram and/or the flow chart and a combination of the blocks in the block diagram and/or the flow chart may be implemented by hardware for performing the specified functions or operations, or may be implemented by a combination of hardware and computer instructions.

The units or modules concerned in the embodiments described in the present disclosure may be implement by means of software, or hardware.

According to the above description of the embodiments, those skilled in the art may clearly understand that each embodiment may be implement with the aid of software plus necessary universal hardware platforms; of course, it may be implemented via hardware. Based on such an understanding, the essential part of the technical solutions in the embodiments of the invention, or in other words, the part that contributes to the prior art, may be embodied in the form of a software product that is stored in a computer-readable storage medium, for example, Read-Only Memory (ROM), Random-Access Memory (RAM), magnetic disc or compact disc, etc., and includes several instructions that can make a computer device (which may be a personal computer, a server or a network device, etc.) implement the method according to each embodiment or certain parts of the embodiment.

Finally, it should be noted that, the above embodiments are only provided for illustrating, rather than limiting, the technical solutions of the invention; although detailed illustration of the invention has being given referring to the above embodiments, it should be understood by one of ordinary skills in the art that modifications may be made on the technical solutions recorded in each of the above embodiment, or equivalent substitutions may be made on a part of the technical features thereof, without departing from the concept and scope of the technical solutions in each embodiment of the invention.

What is claimed is:

1. A method of allocating time slots for a wireless headset in a communication period, the wireless headset comprising a first earpiece and a second earpiece that are configured to receive audio data from a mobile device and are independent from each other, wherein the method comprises steps of:
   1) sending, by the first earpiece, a request message to the mobile device in a first time slot of the communication period;
   2) sending, by the mobile device, the audio data with a preset time slot-based length to the first earpiece and the second earpiece in a plurality of time slots subsequent to the first time slot based on the request message;
   3) sending, by the first earpiece, a first control message to the second earpiece in a second time slot after the plurality of time slots; and
   4) sending, by the second earpiece, a second control message to the first earpiece in a third time slot subsequent to the second time slot based on the first control message.

2. The method according to claim 1, wherein the first control message comprises local earpiece address information, local clock information and a first audio data packet sequence number, and the second control message at least comprises a second audio data packet sequence number.

3. The method according to claim 1, wherein the first control message comprises a switching command for switching operations of the first earpiece and the second earpiece in a next communication period following the communication period, and the second control message comprises response information to the switching command;
   wherein the method further comprises a step of:
   5) repeating steps 1) to 4) after the operations of the first earpiece and the second earpiece are switched, in said next communication period, after the first earpiece receives the response information to the switching command.

4. The method according to claim 1, wherein the first control message comprises a delayed-switching command for indicating a number of communication periods for which switching of the operations of the first earpiece and the second earpiece is to be delayed subsequent to the communication period, and the second control message comprises response information to the delayed-switching command;
   wherein the method further comprises a step of:
   6) determining, by the first earpiece and the second earpiece according to the delayed-switching command, the number of communication periods for which repeating of steps 1) to 4) after the operations of the first earpiece and the second earpiece are switched is to be delayed subsequent to the communication period, after the first earpiece receives the response information to the delayed-switching command.

5. The method according to claim 4, wherein step 6) further comprises: resending, by the first earpiece, the delayed-switching command in a next communication period following the communication period, when the first earpiece fails to receive the response information to the delayed-switching command.

6. The method according to claim 4, wherein step 6) further comprises: resending, by the first earpiece, the delayed-switching command in a next communication period following the communication period and reducing the number of communication periods indicated by the delayed-switching command, when the first earpiece fails to receive the response information to the delayed-switching command.

7. The method according to claim 1, wherein the first control message further comprises: a first audio data packet sequence number for indicating a serial number of a data packet corresponding to the audio data received in the communication period, and the second control message further comprises a second audio data packet sequence number for indicating a serial number of a data packet corresponding to the audio data received in the communication period;

wherein the method further comprises a step of:
7) adding, by the first earpiece, a retransmission command into the request message sent to the mobile device in a next communication period following the communication period when the first earpiece determines after receiving the second audio data packet sequence number that the second audio data packet sequence number is inconsistent with the first audio data packet sequence number, to instruct the mobile device to retransmit the audio data that has been transmitted in the communication period.

8. The method according to claim 1, wherein the first control message comprises: a control information period update command for indicating that a number of communication periods per which the first earpiece and the second earpiece exchange the first control message and the second control message needs to be changed, and a control information period update set value for indicating the number of communication periods per which the first earpiece and the second earpiece can exchange the first control message and the second control message subsequent to the communication period, and the second control message comprises response information to the control information period update command;

wherein the method further comprises a step of:
8) after receiving the response information to the control information period update command, determining, by the first earpiece according to the control information period update set value, the number of communication periods per which the first control message is to be sent to the second earpiece subsequent to the communication period, and determining, by the second earpiece according to the control information period update set value, the number of communication periods per which the second control message is to be sent to the first earpiece subsequent to the communication period.

9. A wireless headset, for which time slots are allocated in a communication period, comprising a first earpiece and a second earpiece, wherein the first earpiece is configured to send a request message to a mobile device in a first time slot of the communication period, receive audio data with a preset time slot-based length sent by the mobile device in a plurality of time slots subsequent to the first time slot, and send a first control message to the second earpiece in a second time slot after the plurality of time slots; and the second earpiece is configured to receive audio data with the preset time slot-based length sent by the mobile device in the plurality of time slots subsequent to the first time slot, and send a second control message to the first earpiece in a third time slot subsequent to the second time slot based on the first control message;

and wherein the first earpiece and the second earpiece are wirelessly connected with the mobile device and are independent from each other.

10. The wireless headset according to claim 9, wherein the first control message comprises a switching command for switching operations of the first earpiece and the second earpiece in a next communication period following the communication period, and the first control message comprises response information to the switching command;

wherein the first earpiece is further configured to switch to perform the operations of the second earpiece in said next communication period after receiving the response information to the switching command; and the second earpiece is further configured to switch to perform the operations of the first earpiece in said next communication period.

11. The wireless headset according to claim 9, wherein the first control message comprises a delayed-switching command for indicating a number of communication periods for which switching of the operations of the first earpiece and the second earpiece is to be delayed subsequent to the communication period, and the second control message comprises response information to the delayed-switching command;

wherein the first earpiece is further configured to determine, according to the delayed-switching command after receiving the response information to the delayed-switching command, the number of communication periods for which switching to performing the operations of the second earpiece is to be delayed subsequent to the communication period; and the second earpiece is further configured to determine, according to the delayed-switching command, the number of communication periods for which switching to performing the operations of the first earpiece is to be delayed subsequent to the communication period.

12. The wireless headset according to claim 11, wherein the first earpiece is further configured to resend the delayed-switching command in a next communication period following the communication period when the first earpiece fails to receive the response information to the delayed-switching command.

13. The wireless headset according to claim 11, wherein the first earpiece is further configured to resend, when the first earpiece fails to receive the response information to the delayed-switching command, the delayed-switching command in a next communication period following the communication period and reduce the number of communication periods indicated by the delayed-switching command.

14. The wireless headset according to claim 9, wherein the first control message further comprises a first audio data packet sequence number for indicating a serial number of a data packet corresponding to the audio data received in the communication period, and the second control message further comprises a second audio data packet sequence number for indicating a serial number of a data packet corresponding to the audio data received in the communication period;

wherein the first earpiece is further configured to add a retransmission command into the request message sent to the mobile device in a next communication period following the communication period when the first earpiece determines, after receiving the second audio data packet sequence number, that the second audio data packet sequence number is inconsistent with the first audio data packet sequence number, to instruct the mobile device to retransmit the audio data sent in the communication period.

15. The wireless headset according to claim 9, wherein the first control message comprises: a control information period update command for indicating that a number of communication periods per which the first earpiece and the second earpiece exchange the first control message and the second control message needs to be changed, and a control information period update set value for indicating the number of communication periods per which the first earpiece and the second earpiece can exchange the first control message and the second control message subsequent to the communication period, and the second control message comprises response information to the control information period update command;

wherein the first earpiece is further configured to determine, according to the control information period update set value after receiving the response information to the control information period update command, the number of communication periods per which the first control message is to be sent to the second earpiece subsequent to the communication period; and the second earpiece is further configured to determine, according to the control information period update set value, the number of communication periods per which the second control message is to be sent to the first earpiece subsequent to the communication period.

16. A method of allocating time slots for a wireless headset in a communication period, the wireless headset comprising a first earpiece, a second earpiece and at least one other earpiece that are configured to receive audio data from a mobile device and are independent from each other, wherein the method comprises steps of:

1) sending, by the first earpiece, a request message to the mobile device in a first time slot of the communication period;

2) sending, by the mobile device, the audio data with a preset time slot-based length to the first earpiece, the second earpiece and the at least one other earpiece in a plurality of time slots subsequent to the first time slot based on the request message;

3) sending, by the first earpiece, a first control message to the second earpiece and the at least one other earpiece in a second time slot after the plurality of time slots; and 4) sending, by the second earpiece, a second control message to the first earpiece and the at least one other earpiece in a third time slot subsequent to the second time slot based on the first control message.

17. The method according to claim 16, wherein the first control message at least comprises local earpiece address information, local clock information and a first audio data packet sequence number, and the second control message at least comprises a second audio data packet sequence number.

18. The method according to claim 16, wherein the first control message comprises a switching command for switching operations of the first earpiece and the second earpiece in a next communication period following the communication period, and the second control message comprises response information to the switching command;

wherein the method further comprises a step of:

5) repeating steps 1) to 4) after the operations of the first earpiece and the second earpiece are switched, in said next communication period after the first earpiece receives the response information to the switching command.

19. The method according to claim 16, wherein the first control message comprises a delayed-switching command for indicating a number of communication periods for which switching of the operations of the first earpiece and the second earpiece is delayed subsequent to the communication period, and the second control message comprises response information to the delayed-switching command;

wherein the method further comprises a step of:

6) determining, by the first earpiece and the second earpiece according to the delayed-switching command, the number of communication periods for which repeating of steps 1) to 4) after the operations of the first earpiece and the second earpiece are switched is to be delayed subsequent to the communication period, after the first earpiece receives the response information to the delayed-switching command.

20. The method according to claim 19, wherein step 6) further comprises: resending, by the first earpiece, the delayed-switching command in a next communication period following the communication period when the first earpiece fails to receive the response information to the delayed-switching command.

\* \* \* \* \*